Nov. 29, 1966  V. L. FRANKLIN  3,288,416

TISSUE BOX HOLDER FOR VEHICLES

Filed Jan. 13, 1966

Virgil L. Franklin
INVENTOR.

BY *Clarence A. O'Brien*
and *Harvey B. Jacobson*
Attorneys

… (United States Patent Office)

3,288,416
TISSUE BOX HOLDER FOR VEHICLES
Virgil L. Franklin, 1100 W. 14th St., Odessa, Tex.
Filed Jan. 13, 1966, Ser. No. 520,438
5 Claims. (Cl. 248—311)

This invention relates to an automotive accessory which is expressly made and adapted for acceptable and practical use in the passenger accommodating and seating space of an automobile (or an equivalent vehicle or conveyance) and which is an innovation in that it has the capability of holding a ready-to-use dispensing box of tissues in a manner to conveniently serve the driver or any one of the passengers.

Bracket-type hangers and holders for use in automobiles and elsewhere and which serve to position a dispensing-type tissue box for accessible use are of many and varied forms as persons conversant with the art full well appreciate. Even so and nevertheless constant effort is being resorted to, as here, to advance the art and to bring into being a box holder for automobile use which will reliably serve the purposes for which it is intended and will promote the requirements of commerciability, economy, production and sale on a mass production basis and, what is more important, not only holds the tissue box securely but at a place of vantage which will render the tissues readily and safely accessible.

In carrying out the principles of the present invention a lightweight but durable and sturdy frame unit is provided. More specifically the unit is such in construction that it provides a practical openwork rack. To the ends desired the rack is unique in that it comprises paired arms which have terminal hooks and which are constructed to embrace portions of the box to adequately support the box. These arms are L-shaped in edge elevation and are not only in properly paired relationship, they are connected together by an intervening broad and flat-faced strip or strap member which constitutes a primary arm whereby to thus provide a main arm with attaching means at one end and a plurality of auxiliary arms, said arms being proportional and interrelated to effectually embrace and suspend the box in an upside-down, ready-to-use position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
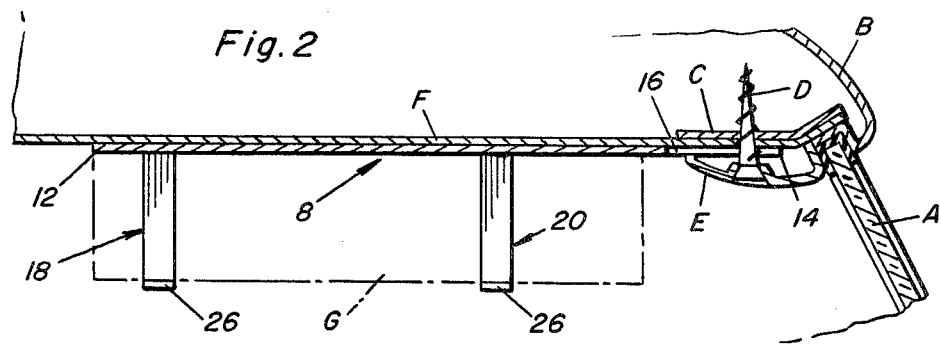
FIGURE 2 is a central longitudinal sectional view of the rack with the box shown in phantom lines and which shows with greater particularity how the bracketing or attaching end of the main arm is installed for use.

Referring now to the views of the drawing and with reference first to FIG. 2 it will be seen that, generally speaking, the letter A designates a conventional automobile or equivalent vehicle windshield, that B designates a portion of the roof structure, that C designates a frame component of the roof or body structure having screw-threaded holes to accommodate at least one assembling and retaining screw D for the coacting strip molding E bordering and retaining an edge portion of the upholstery or lining F in place.

The present invention is such in construction that it can be used in association with the front seat or back seat or both (not shown). It is also such that it will function to readily accommodate the insertable and removable dispensing box G containing tissues H withdrawable through the usual aperture or slot means I.

In carrying out the preferred embodiment of the invention it has been found to be expedient and practical to rely upon the strip component E of the molding and the screw D for anchoring the attachable and detachable openwork frame or rack.

Figure 3:
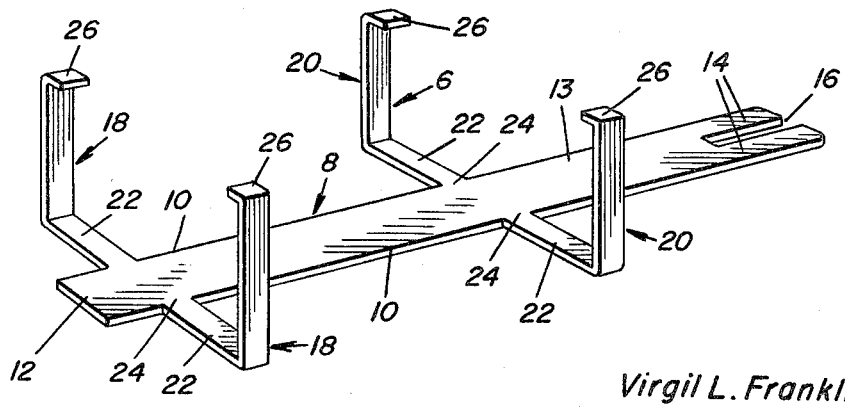
FIGURE 3 is an inverted view in perspective of the rack by itself.

The improved rack is denoted as an overall entity in FIG. 3 by the numeral 6. It is preferably made from stamped sheet material or from stout but yieldable plastic material capable of being molded in different shapes and sizes to accommodate varying tissue containing boxes which are currently on the market. The relatively flat-faced strip or strap member 8 is here designated as a main arm. The linearly straight lengthwise edges are denoted by the numeral 10 in FIG. 3. One end portion of this arm is denoted at 12 and the other end portion at 13. The end portion 13 is bifurcated to define a pair of like furcations 14 and an intervening kerf or slot 16. Actually this construction provides a simple adapter fork which lends itself to applicable and retentive use as shown in FIG. 2. More specifically the prongs 14 of the fork straddle the screw D and are inserted between the frame member C and molding E, the screw passing through the slot 16. Two pairs of auxiliary arms are provided and used in well balanced association in the manner also shown in FIG. 3. The arms of one pair are denoted at 18. The arms of the other pair are denoted at 20. All of these auxiliary arms are the same in construction, that is, each arm is substantially L-shaped in edge elevation whereby one limb or leg thereof, the one denoted at 22 in each instance is joined at 24 to the coacting marginal edge 10 of the main arm 8. In addition, each L-shaped arm has a free terminal end which is directed laterally as at 26 and this provides a convenient hook. Thus the auxiliary arms are not only L-shaped but are provided with attaching and retaining hooks.

Figure 1:
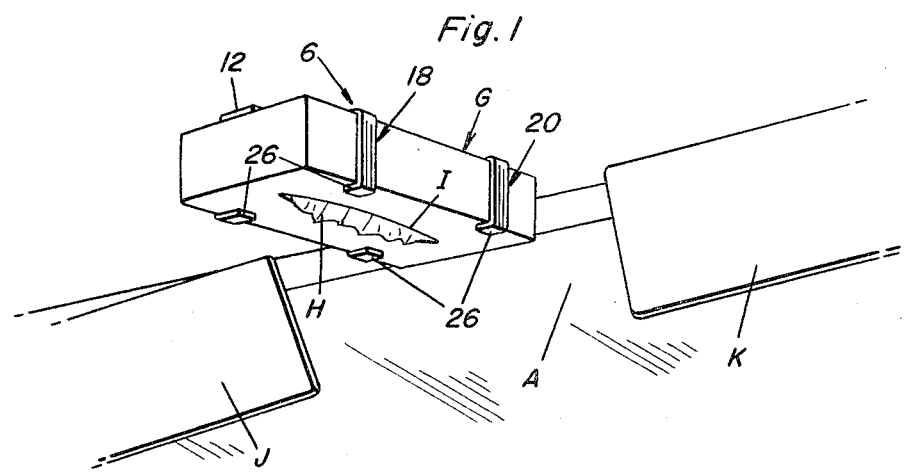
FIGURE 1 is a view in perspective showing a fragmentary portion of an automobile windshield, sun visors to the left and right and racking and bracketing means, a simple openwork rack, suspending a conventional box of withdrawable tissues.

It will be clear from the showing made in FIG. 3 just how the overall bracket or holder is constructed and what the component parts look like and how they cooperate in the desired unitary manner. It will also be evident that in FIG. 3 the rack is shown in its inverted state and that in actual practice it is used in the manner illustrated in FIGS. 1 and 2. If applied to the median front portion of the windshield A, it will assume a satisfactory, ready-to-use position between the sun visors J and K. All that is necessary to put the device into use is to loosen one of the screws D and to slip the prongs or fingers of the fork means into place with the slot straddling the screw after which the screw is again tightened so that the bifurcated end or fork is securely clamped with the broad main arm 8 extending rearwardly over the front seat or at least within convenient range of use of the driver or other occupant of the front seat. The same appropriation of use may be resorted to in installing one of the racks or holders at the rear (not shown) of the automobile. In either event the arms 6 and 8 conveniently cooperate in providing a safe and reliable holder for the insertable and removable tissue containing and dispensing box.

A careful consideration of the specification in conjunction with the views of the drawing will enable the reader to obtain a clear and comprehensive understanding of the novel rack, how it is constructed, and how it is aptly put to use. The features and advantages should likewise be clear. Accordingly, a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An openwork rack capable of elevated overhead installation within the passenger space of an automobile having decorative trim molding marginally bordering and fastening upholstery where needed, said rack being of simple onepiece form and adapted to encompass and support a readily insertable and removable cardboard tissue containing and dispensing box, said rack comprising a relatively broad flat-faced sheet material strap member, said strap member designed to be of a length greater than the length of said box, being narrow compared to the width of the box and providing a single main arm, and a plurality of smaller and narrower auxiliary arms joined to lengthwise marginal edge portions of said main arm and depending laterally therefrom and having free lower end portions provided with turned-in terminals constituting and providing hanger hooks, said main arm being adapted to overlie said box, said auxiliary arms being adapted to embrace portions of said box at spaced apart portions of the box and said hooks being adapted to project beneath and suspend said box.

2. The rack according to claim 1, and wherein said main arm is linearly straight and has one end bifurcated and defining and providing attaching fingers and an intervening slot, said fingers adapted to be fitted between the molding and upholstery, and said slot being adapted to accommodate screws such as used to fasten the molding in its prescribed place.

3. The rack according to claim 2 and wherein said auxiliary arms are substantially L-shaped in edge elevation, are alike in construction and dimensions and are distributively arranged relative to said main arm and to each other.

4. The rack defined in claim 2, and wherein there are two pairs of auxiliary arms, the arms in each pair being aligned, coordinated and properly paired in coacting relationship to equalize the support facilities of the overall rack.

5. The rack according to claim 4 and wherein all of the arms are of the same cross-sectional thickness and the companion surfaces are flush with each other for smooth-functioning box-holding results.

References Cited by the Examiner

UNITED STATES PATENTS

| | | | |
|---|---|---|---|
| 748,438 | 12/1903 | Trahan | 248—300 |
| 2,488,326 | 11/1949 | Pratt | 248—311 |
| 2,515,523 | 7/1950 | Mancino | 248—311 |
| 3,046,049 | 7/1962 | Paxton | 211—31 |
| 3,214,059 | 10/1965 | Stark | 221—46 |

CLAUDE A. LE ROY, *Primary Examiner.*